(12) United States Patent
Pischel

(10) Patent No.: US 9,677,606 B2
(45) Date of Patent: Jun. 13, 2017

(54) BIDIRECTIONAL BEARING, DRIVE TRAIN, PLANETARY GEAR AND WIND GENERATOR

(71) Applicant: AREVA WIND GMBH, Bremerhaven (DE)

(72) Inventor: Klaus Pischel, Schiffdorf-Spaden (DE)

(73) Assignee: Areva Wind GmbH, Bremerhaven (DE)

( * ) Notice: Subject to any disclaimer, the term of this patent is extended or adjusted under 35 U.S.C. 154(b) by 0 days.

(21) Appl. No.: 15/104,569

(22) PCT Filed: Dec. 15, 2014

(86) PCT No.: PCT/EP2014/077848
§ 371 (c)(1),
(2) Date: Jun. 15, 2016

(87) PCT Pub. No.: WO2015/091407
PCT Pub. Date: Jun. 25, 2015

(65) Prior Publication Data
US 2016/0312825 A1    Oct. 27, 2016

(30) Foreign Application Priority Data
Dec. 16, 2013  (EP) ..................................... 13197573

(51) Int. Cl.
*F16C 23/04* (2006.01)
(52) U.S. Cl.
CPC .......... *F16C 23/043* (2013.01); *F16C 23/048* (2013.01); *F16C 2360/31* (2013.01)
(58) Field of Classification Search
CPC ...... F16C 23/043; F16C 23/048; F16C 17/26; F16C 17/04
See application file for complete search history.

(56) References Cited

U.S. PATENT DOCUMENTS 1,121,083 A * 12/1914 Ferranti .................. F16C 17/04
                                                              384/304
1,476,345 A    12/1923 Mcgee
(Continued)

FOREIGN PATENT DOCUMENTS

DE    597408    5/1934
DE    3326415   2/1985

OTHER PUBLICATIONS

International Search Report and Written Opinion of International Application No. PCT/EP2014/077848 mailed on Jun. 18, 2015.
(Continued)

*Primary Examiner* — Thomas R. Hannon
(74) *Attorney, Agent, or Firm* — Carlson, Gaskey & Olds, PC

(57) ABSTRACT

A bidirectional bearing, a drive train, a planetary gear and a wind generator having a bidirectional bearing are provided. A bidirectional bearing comprises an outer bearing shell having a first intermediate bearing shell, which is coupled to the shaft and which cooperates with the outer bearing shell. The bidirectional bearing further comprises a second intermediate bearing shell, which is arranged opposite to the outer bearing shell with respect to the first intermediate bearing shell. The second intermediate bearing shell is configured to take up a first load having a first direction from the first intermediate bearing shell. Furthermore, the first second intermediate bearing shell is configured to receive a second load having a second direction, which is substantially opposite to the first direction. The first intermediate bearing shell receives the second load from the second intermediate bearing shell and is configured to transfer this second load to the outer bearing shell.

15 Claims, 5 Drawing Sheets

(56) References Cited

U.S. PATENT DOCUMENTS

| | | | | | |
|---|---|---|---|---|---|
| 2,324,095 | A | * | 7/1943 | Lieberherr | F16C 17/18 277/507 |
| 2,527,229 | A | * | 10/1950 | Roubal | F16C 17/04 384/426 |
| 7,090,402 | B2 | * | 8/2006 | Peet | B61F 5/16 384/193 |

OTHER PUBLICATIONS

International Preliminary Report on Patentability, mailed Jun. 30, 2016 in corresponding International Application No. PCT/EP2014/077848.

* cited by examiner

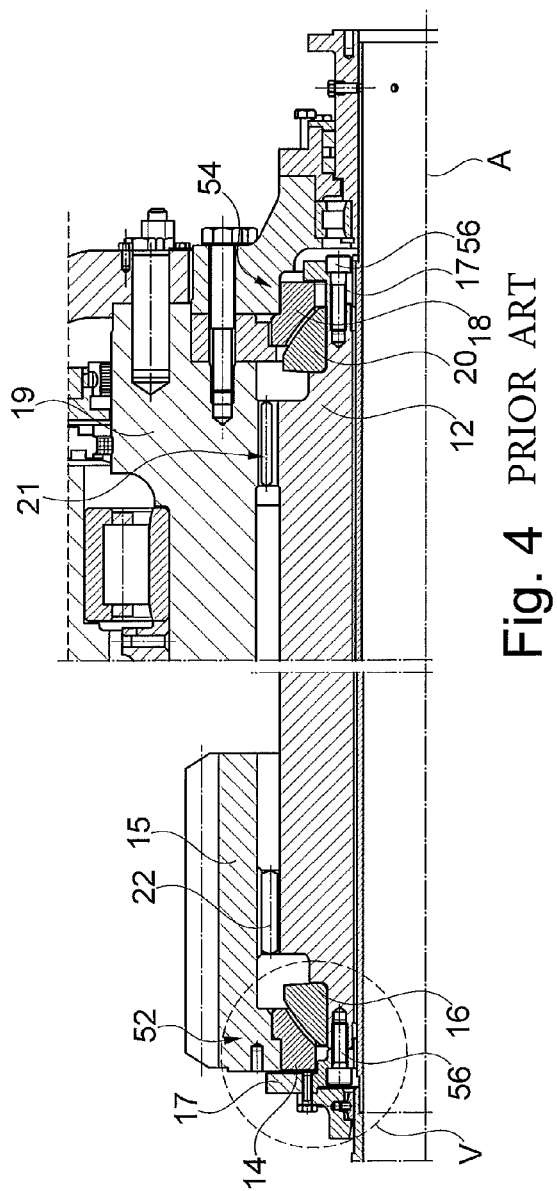
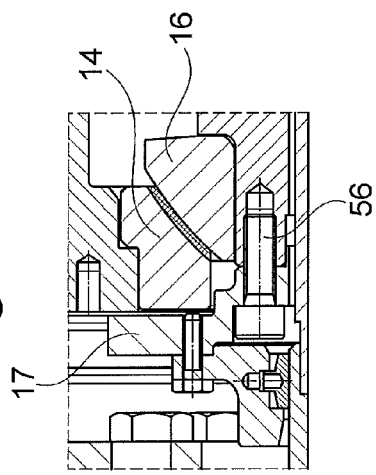
Fig. 4 PRIOR ART
Fig. 5 PRIOR ART

BIDIRECTIONAL BEARING, DRIVE TRAIN, PLANETARY GEAR AND WIND GENERATOR

RELATED APPLICATION

This is the U.S. national phase of PCT/EP2014/077848, filed Dec. 15, 2014, which claimed priority to European Application 13 197 573.2, filed Dec. 16, 2013.

TECHNICAL FIELD

The invention relates to a bidirectional bearing, a drive train, a planetary gear comprising a bidirectional bearing and to a wind generator having a planetary gear.

BACKGROUND

Spherical bearings (also known as cup bearings) provide a cardanic or gimballed mount of a rotating part, for example of a shaft of a gear. The motion of the shaft is restricted to rotation. In order to mount the shaft in axial direction, the spherical bearing acts as a bidirectional thrust bearing allowing angular deflections between the shaft and the shaft support. For this purpose, a ball socket of the spherical bearing may be sufficiently great to surround the spherical head of the bearing. According to an alternative design, a spherical bearing may comprise two counteracting ball sockets, which limit the movement of the ball head to a rotary motion. A third commonly known design concept applies two separate spherical bearings forming a set of bearings, which limits the movement of the ball head in axial direction. The hemispheres of the two counteracting ball sockets are typically arranged to have a common center so as to allow a slight tilting between the shaft axis (ball head) and the supported element axis (bearing socket).

Spherical bearings have widespread applications. Among these, one possible application is mounting of a shaft in a planetary gear. Furthermore, planetary gears may be applied in the drive train of a wind generator (also known as a wind energy plant, a wind power plant or a wind turbine). However, in particular in planetary gears, there may be limited construction space for the bearings.

SUMMARY

It is an object of the invention to provide a bidirectional bearing having a compact design. Furthermore, it is an object of the invention to provide a compact drive train and a compact planetary gear as well as a wind generator having a compact drive train or planetary gear.

In one aspect of the invention, a bidirectional bearing comprising an outer bearing shell and a first intermediate bearing shell, which is coupled to a shaft, is provided. The first intermediate bearing shell cooperates with the outer bearing shell. The bidirectional bearing further comprises a second intermediate bearing shell, which is arranged opposite to the outer bearing shell with respect to the first intermediate bearing shell. The second intermediate bearing shell is configured to take up a first load having a first direction. The first intermediate bearing shell transfers this first load to the second intermediate bearing shell. Furthermore, the first intermediate bearing shell is configured to receive a second load having a second direction. This second direction is substantially opposite to the first direction. The first intermediate bearing shell receives the second load from the second intermediate bearing shell and is furthermore configured to transfer the second load to the outer bearing shell. In particular, the bidirectional bearing may further comprise an inner bearing shell (for example an inner spherical disk), which is configured to couple the second load to the second intermediate bearing shell for further transfer of the second load via the first intermediate bearing shell to the outer bearing shell.

Advantageously, the double shell design of the bidirectional bearing according to aspects of the invention is very compact. In comparison to bidirectional bearings according to the prior art, the double shell bidirectional bearing according to aspects of the invention has a reduced construction space or volume. This is particularly advantageous for the application of this bearing in a planetary gear, which typically offers restricted construction space only. The very compact design of the bidirectional bearing according to aspects of the invention is achieved because both, the first intermediate bearing shell and the second intermediate bearing shell have a double function. In particular, the first intermediate bearing shell takes up a first load in the first direction and transfers a second load from the second intermediate bearing shell to the outer bearing shell in a second and substantially opposite direction. Similarly, the second intermediate bearing shell takes up the first load from the outer bearing shell and transfers a second load via the first intermediate bearing shell to the outer bearing shell. The second intermediate bearing shell may receive the load in the second direction from the inner bearing shell (for example an inner spherical disk).

The concept of the advantageous double shell design of the bearing according to aspects of the invention is not limited to a particular type of bearing. The bidirectional bearing may be a ball bearing or a plain bearing, for example. However, in order to have a particularly flat and compact bearing, the bidirectional bearing may be a sliding bearing or even a hydrodynamic sliding bearing.

The first and the second load may have a substantially opposite first and second direction, respectively. Consequently, the bearing is suitable to take up a bidirectional load. In other words, a compact bidirectional thrust bearing may be provided.

Advantageously, the bidirectional bearing may be a spherical bearing. Consequently, a bidirectional cardanic or gimballed mount of the shaft is provided. This enables the bidirectional bearing to take up loads, which deviate more or less slightly from a mere axial load. According to this aspect of the invention, the sliding surfaces, which are adjacent to a bearing gap or sliding interface between the outer bearing shell and the first intermediate bearing shell, between the first intermediate bearing shell and the second intermediate bearing shell and in particular between the second intermediate bearing shell and the second bearing shell, may have a substantially identical centerpoint of radius of curvature. To be more precise, the sliding surfaces may be spherical sections having a common center or common central point. A shaft being supported by this spherical bearing may then tilt around this centerpoint or common central point.

According to another aspect of the invention, the outer bearing shell and the first intermediate bearing shell are arranged to be directly adjacent to each other. Within the context of this specification, parts of the bearing are referred to be arranged "directly" adjacent to each other when a bearing gap between the parts is preserved. In particular, the first intermediate bearing shell and the second intermediate bearing shell are also arranged to be directly adjacent to each other. Furthermore, the outer bearing shell, the first intermediate bearing shell, and the second intermediate bearing shell are arranged to be directly adjacent to each other. Furthermore, the first intermediate bearing shell may comprise a sliding surface, which cooperates with a sliding surface of the outer bearing shell. The first intermediate bearing shell may further comprise an opposite sliding surface, which cooperates with the sliding surface of the second intermediate bearing shell. In particular, the second intermediate bearing shell and the inner bearing shell may be arranged to be directly adjacent to each other. The second intermediate bearing shell may comprise a sliding surface that cooperates with a sliding surface of the first intermediate bearing shell. Furthermore, the second intermediate bearing shell may comprise an opposite sliding surface that cooperates with the sliding surface of the inner bearing shell.

The bidirectional bearing according to aspects of the invention has a very compact design when the first intermediate bearing shell, the outer bearing shell, the second intermediate bearing shell, and the inner bearing shell are arranged directly adjacent to each other and are further configured to have sliding surfaces to provide a slide bearing.

The bidirectional bearing as previously described, and comprising the outer bearing shell, the first and second intermediate bearing shell, and the inner bearing shell, is advantageously a spherical bearing. In other words, the outer bearing shell, the first and second intermediate bearing shell, and the inner bearing shell can all have surfaces having a spherical shape. Advantageously, there can further be splined connections between the coupling shaft and the sun pinion as well as between the coupling shaft and the output hollow shaft. These splined connections are then advantageously arranged close to the ends of coupling shaft and inside (towards the center of the coupling shaft) the bearing. The splined connections represent the radial support of the coupling shaft. The splined connections allow for a slight tilting of the shaft. The bidirectional bearing as previously described (comprising the outer bearing shell, the first and second intermediate bearing shell, and the inner bearing shell) is advantageously arranged on both ends of the shaft. The center of tilting of the entire spherical mounting is then advantageously in the same plane as the middle plane of the splined connections. Together they form a torque transmission element which is axially supported by the spherical bearings, thus allowing torque transmission while the hollow shaft is free to tilt slightly.

According to another aspect of the invention, a drive train and a planetary gear comprising a bidirectional bearing according to aspects of the invention is provided. In particular, the bidirectional bearing may support a coupling shaft of the planetary gear.

According to another aspect of the invention, a wind generator comprising a planetary gear according to aspects of the invention may be provided.

Same or similar advantages, which have been mentioned with respect to the bidirectional bearing according to aspects of the invention, apply to the planetary gear and to the wind generator in a same or similar way and are therefore not repeated.

These and other features may be best understood from the following drawings and specification.

BRIEF DESCRIPTION OF THE DRAWINGS

Further aspects and features of the invention ensue from the following description of preferred embodiments of the invention with reference to the accompanying drawings, wherein FIG. 4 is a simplified detailed cross section showing a coupling shaft of a planetary gear, which is mounted using an antagonistic pair of thrust bearings according to the prior art, FIG. 5 is a detail of FIG. 4.

DETAILED DESCRIPTION

Figure 1:
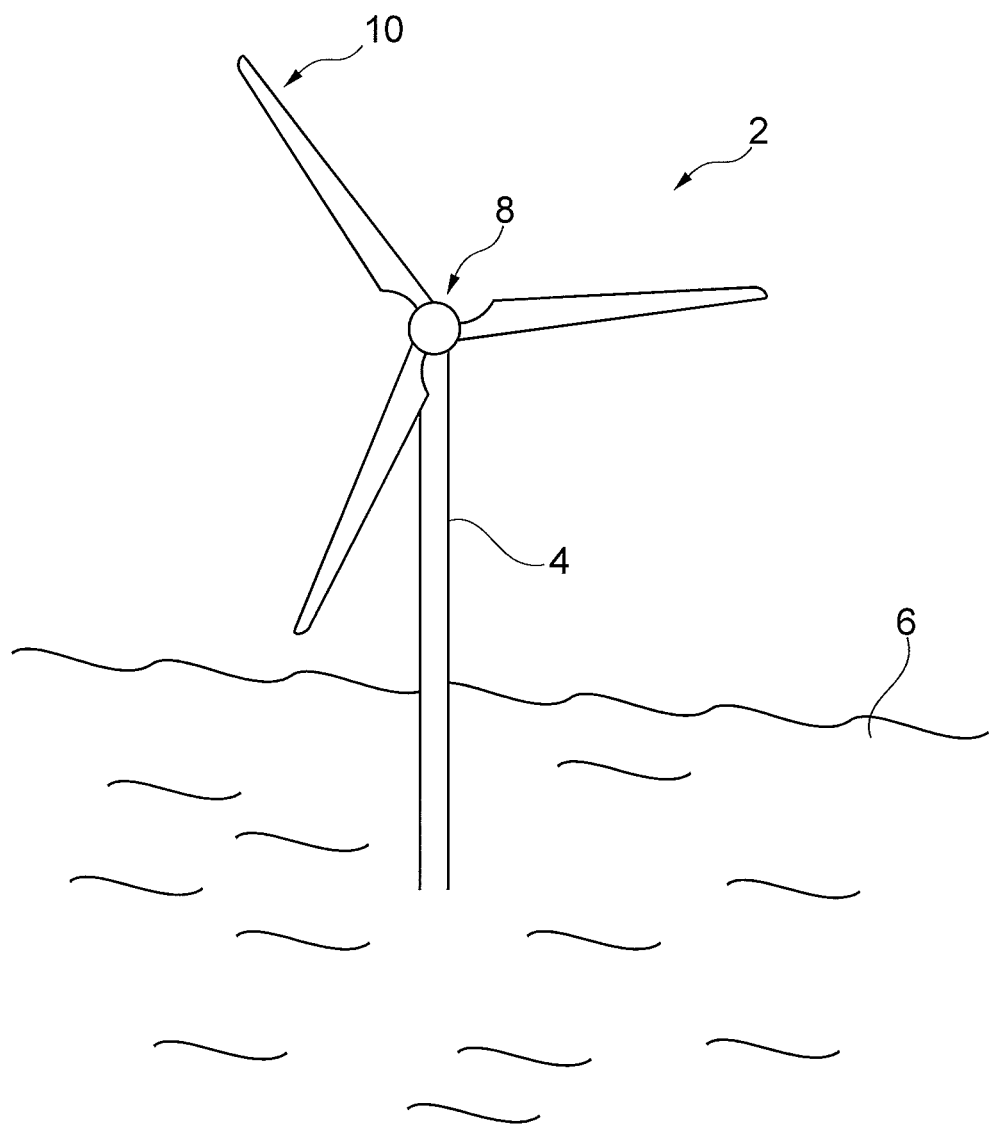
FIG. 1 is a simplified wind generator according to an embodiment of the invention.

FIG. 1 is a simplified wind generator 2 according to an embodiment of the invention. The wind generator 2 comprises a supporting structure 4, which is based on a suitable foundation in the sea 6. By way of an example only, the wind generator 2 is an offshore wind generator. A nacelle (not visible) is arranged at the top of the supporting structure 4, which may be for example a tower. A rotor hub 8 carrying a plurality of rotor blades 10 is coupled to a main shaft 72 of a drive train 70.

Figure 2:
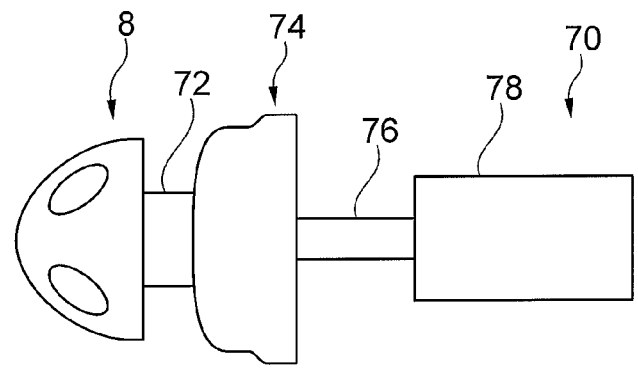
FIG. 2 is a simplified drive train of a wind generator according to an embodiment of the invention.

A simplified drive train 70 according to an embodiment of the invention is shown in FIG. 2. The drive train 70 may be arranged in the nacelle of the wind generator 2. The rotor hub 8 is coupled to the main shaft 72, which is the driving shaft of a planetary gear 74. A driven shaft of the planetary gear 74 drives an input shaft 76 of a generator 78. The drive train 70 may comprise the rotor hub 8, the main shaft 72, the planetary gear 74, and the output shaft thereof, which is the input shaft 76 of the generator 78.

Figure 3:
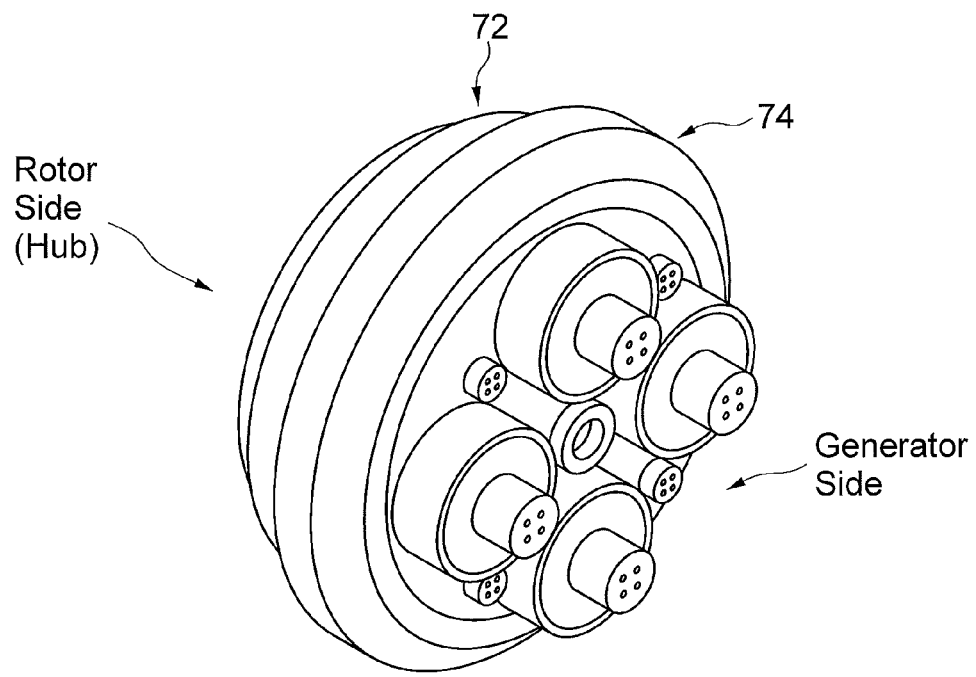
FIG. 3 is a simplified perspective view showing a planetary gear according to an embodiment of the invention.

FIG. 3 is a simplified perspective view of the planetary gear 74 according to an embodiment of the invention. The main shaft 72 may be coupled at the same time to the input shaft of the planetary gear 74 via the rotor hollow shaft (not shown). The rotor side (hub side) and the generator side are also indicated.

According to the prior art, in particular a coupling shaft of a prior art planetary gear may be mounted using a pair of counteracting spherical bearings. FIG. 4 shows a detailed cross section of a coupling shaft 12 of this planetary gear. By way of an example, the coupling shaft 12 may be a hollow shaft. There is a helical planet gear (not shown), which engages a sun pinion or sun gear 15. The coupling shaft 12 transfers the torque from the sun pinion 15 to the output shaft 19. The splined connection 22 connecting sun pinion 15 with coupling shaft 12 and the splined connection 21 connecting coupling shaft 12 with the output hollow shaft 19 represent the radial support of the coupling shaft 12. For axial load support and restriction of the movement of the coupling shaft 12 to a mere tilting movement, a first spherical bearing 52, which comprises a first bearing shell 14 and a first spherical disk 16, is arranged on a left side of the shaft 12. A second spherical bearing 54, which comprises a second bearing shell 18 and a second spherical disk 20, may be arranged on a right side of the shaft 12. The bearings 52, 54 of the planetary gear are configured for normal or standard operation of the wind generator. This means, due to the rotation of the rotor hub 8, the main shaft 72 applies a torque to the planetary gear 74, which is transferred to the generator 78 for power production. However, in non-standard operation modes, for example when a short circuit of the generator 78 occurs, there may be an alternation of the load or load reversal. This reverse operation may cause highly dynamic operating states including various oscillations in the planetary gear.

In particular, a load reversal in the planetary gear 74 may cause a support plate 17 to be the subject of a significant axial load. This requires a significant safety margin for screws 56 that are used for mounting of the support plate 17. The axis A of the shaft 12 may be slightly tilted with respect to the axis (central axis) of the sun pinion 15 due to different load distributions of the planets and due to manufacturing tolerances. As a consequence of this tilting, the fastening screws 56 will be exposed to different load levels during load reversal. A more detailed view of this prior art concept is shown in FIG. 5, which is a detail of FIG. 4.

Figure 6:
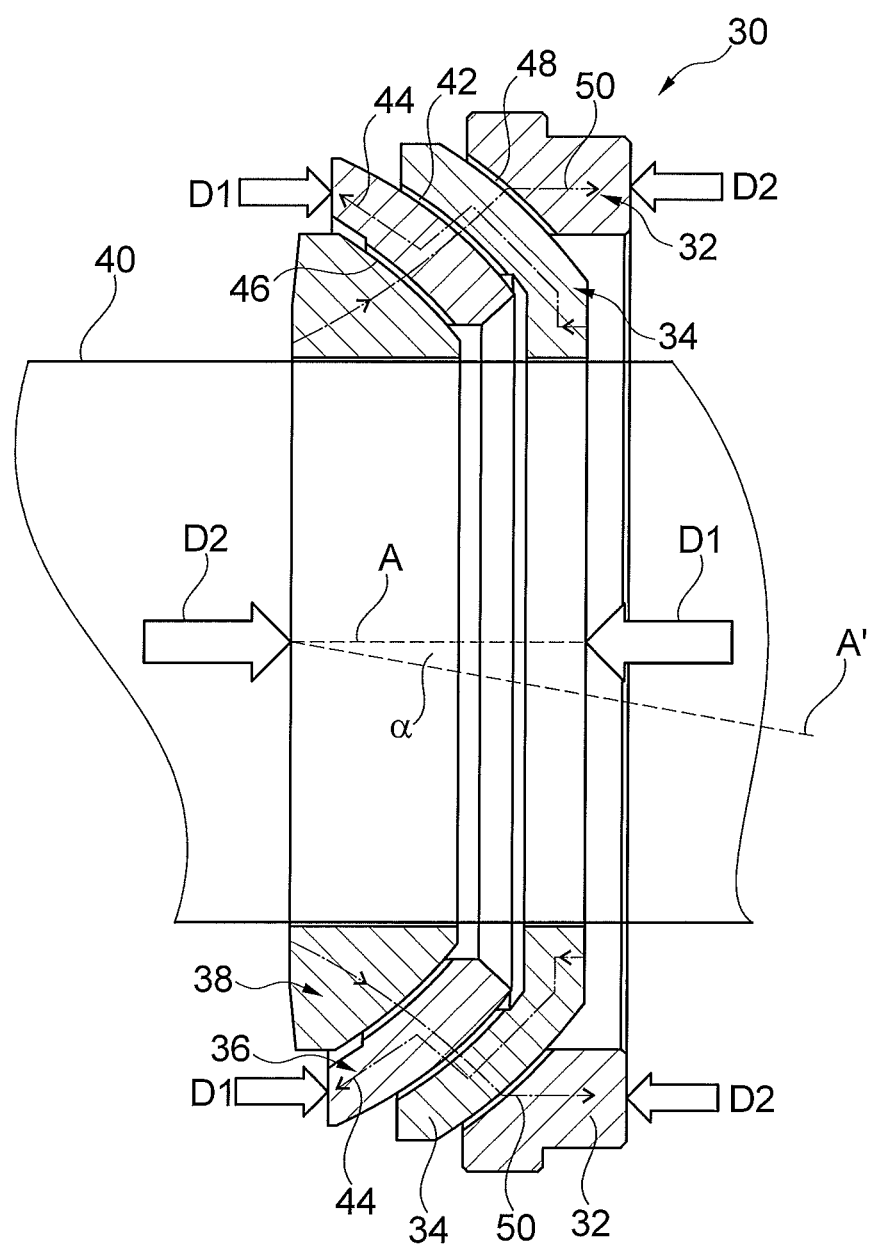
FIG. 6 is a simplified cross sectional view showing a bidirectional bearing according to an embodiment of the invention.

The bidirectional bearing according to aspects of the invention inter alia overcomes these technical drawbacks. In FIG. 6, there is a simplified cross section of a bidirectional bearing 30 according to an embodiment of the invention.

The bidirectional bearing 30 comprises a first outer bearing shell 32, which cooperates with a first intermediate spherical bearing shell 34. Furthermore, the bidirectional bearing 30 comprises a second intermediate bearing shell 36 and an inner bearing shell 38. The first intermediate bearing shell 34 and the second intermediate bearing shell 36 have a double functionality. They are both configured to take up a load and, at a same time, transfer a load.

The outer bearing shell 32 and the second intermediate bearing shell 36 are fixed parts, which may be coupled to a machine housing of the planetary gear 74 for example (FIG. 3). The first intermediate bearing shell 34 and the inner bearing shell 38 are rotating parts; they may be coupled to a shaft 40 of the planetary gear 74. In particular, the shaft 40 may be a coupling shaft 12 of the planetary gear 74. The bidirectional bearing 30 may be a bidirectional thrust bearing for mounting of the shaft 40. This means, the bidirectional bearing 30 is capable of taking up a first load having a first direction D1 and, at a same time, the bidirectional bearing 30 may take up a second load having a second direction D2. The first direction D1 and the second direction D2 may be substantially axial directions, which are parallel to an initial main axis A of the shaft 40. However, the bidirectional bearing 30 according to aspects of the invention may be configured to take up radial loads. In other words, the bidirectional bearing 30 may be configured to provide a cardanic or gimballed mount of the shaft 40. This will allow the first and second direction D1, D2 to deviate more or less slightly from the initial direction of the axis A. For example, the axis A may be slightly tilted by an angle α. This will result in a tilted axis A'. For clarity reasons only, this angle α is excessively oversized in FIG. 3.

The first intermediate bearing shell 34 takes up a first load having the first direction D1 and transfers the corresponding force via a sliding interface or gap 42 between the first intermediate bearing shell 34 and the second intermediate bearing shell 36 to the second intermediate bearing shell 36. This is illustrated by the force flow shown in dashed-dot line, which is identified by reference numeral 44. This force is coupled into a machine housing for example, which supports the second intermediate bearing shell 36 (indicated by arrows, which point opposite to this force). On the other hand, the bidirectional bearing 30 is configured to take up a second load having the second direction D2. The shaft 40 is coupled to the inner bearing shell 38 and said inner bearing shell 38 couples the corresponding force via a sliding interface or gap 46 into the second intermediate bearing shell 36. However, the intermediate shell 36 does not take up this load. It transfers the load via the sliding interface or gap 42 into the first intermediate bearing shell 34. The first intermediate bearing shell 34 is supported by the outer bearing shell 32 and the force, which is directed in the second direction D2 is finally coupled into the outer bearing shell 32 via the further sliding interface or gap 48. Again, this is illustrated by arrows, which point opposite to this force. The corresponding force flow is indicated by a second dashed-dot line having the reference numeral 50. The outer bearing shell 32 may be supported by a machine housing gear of a planetary gear, for example.

Advantageously, the bidirectional bearing 30 is configured to take up loads in the planetary gear 74 during normal or standard operation of the wind generator 2. Furthermore, in a nonstandard operation mode, for example when a short circuit of the generator 78 occurs, and the load is reversed, the bidirectional bearing 30 is configured to take up the occurring loads in this highly dynamic operating state in the planetary gear 74.

In particular, the axial loads which are induced in the sun gear due to the helical cut of the planet gear are distributed around the circumference of the support plate. Consequently, the fastening screws bear a more homogeneous axial load impact, which is due to the reverse load on the planet gears. A slight tilting of the shaft 40 will furthermore not lead to overload of certain fastening screws. A load level will be averaged because the thrust bearing 30 provides a gimballed mount which is capable of taking up loads in two substantially opposite directions at the same time.

The bidirectional bearing 30 may be a sliding bearing. In other words, the surfaces of the outer bearing shell 32, the first intermediate bearing shell 34, the second intermediate bearing shell 36 and the inner bearing shell 38, which are adjacent to a respective one of the sliding interfaces 42, 46 and 48 may be sliding surfaces. Furthermore, the outer bearing shell 32, the first intermediate bearing shell 34, the second intermediate bearing shell 36 and the inner bearing shell 38 may be arranged to be directly adjacent to each other. A film or lubricant is provided in the sliding interfaces or gaps 42, 46 and 48 to allow a smooth rotation of the mentioned parts of the bidirectional bearing 30.

The bidirectional bearing 30, which is shown in the simplified cross section of FIG. 6 has a very compact design. It provides a bidirectional cardanic mount of the shaft 40. In order to provide this cardanic mount, the sliding surfaces of the outer bearing shell 32, the first intermediate bearing shell 34, the second intermediate bearing shell 36 and the inner bearing shell 38, which are adjacent to the sliding interfaces 42, 46 and 48 may be spherical sections. They may be arranged to have a common center or central point.

Figure 7:
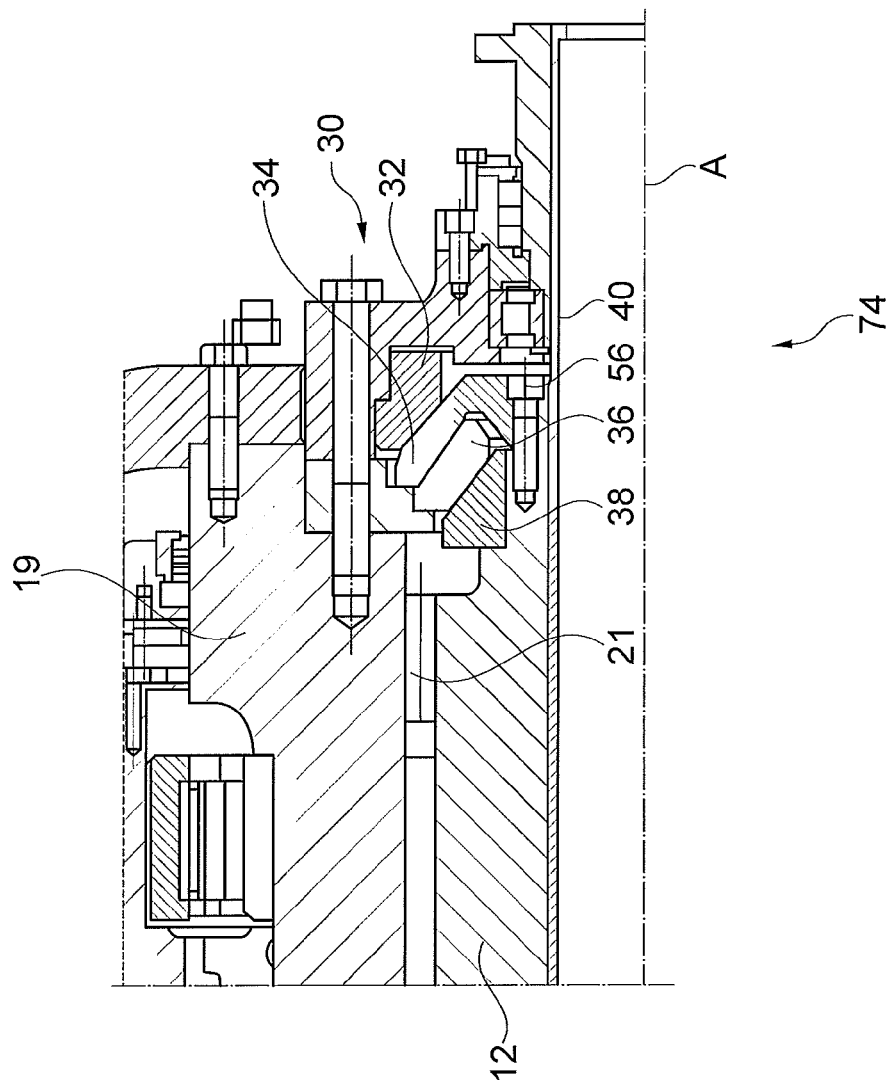
FIG. 7 is another cross sectional view showing a coupling shaft of a planetary gear which is geared using a bidirectional bearing according to an embodiment of the invention.

In FIG. 7, there is a simplified cross section showing a detail of planetary gear 74 according to aspects of the invention. A shaft, for example a coupling shaft 12 of this planetary gear 74, is mounted using a bidirectional bearing 30 according to an embodiment of the invention. The outer bearing shell 32 is supported by a machine housing of the planetary gear 74. Similarly, the second intermediate bearing shell 36 is coupled to the machine housing. The first intermediate bearing shell 34 is coupled to the shaft 40 and projects between the outer bearing shell 32 and the second intermediate bearing shell 36. Similarly, the inner bearing shell (inner spherical disk) 38 is coupled to the shaft 40. The second intermediate bearing shell 36 is coupled to the machine housing. The bidirectional bearing 30 provides a cardanic or gimballed mount of the shaft 40. Even if the shaft 40 is slightly tilted from its initial axial direction A, the second intermediate bearing shell 36 and the outer bearing shell 32, which are coupled to the machine housing, as well as the first intermediate bearing shell 34 and the inner bearing shell (inner spherical disk) 38, which are coupled to the rotational part of the gear, are subject to a homogenous load distribution around their circumference.

Reference is made to FIG. 4 again, and in particular the splined connection 22 (not shown in FIG. 7) the connecting sun pinion 15 (not shown in FIG. 7) with coupling shaft 12 and splined connection 21 connecting coupling shaft 12 with the output hollow shaft 19. These splined connections 21, 22 shown in FIG. 4 also represent the radial support of the coupling shaft 12 in the embodiment partially shown in FIG. 7. The splined connections allow for a slight tilting of the shaft 12. The bidirectional bearing 30 as previously described (comprising the outer bearing shell, the first and second intermediate bearing shell and the inner bearing shell) is advantageously arranged on both ends of the shaft 40. The center of tilting of the entire spherical mounting of this embodiment is advantageously in the same plane as the middle plane of the splined connections 21, 22 (as shown in FIG. 4). Together they form a torque transmission element which is axially supported by the spherical bearings (at left and the right end of the shaft), thus allowing torque transmission while the (hollow) shaft 40 is free to tilt slightly. Fastening screws 56 do not need to be dimensioned as oversized parts due to the homogenous load distribution. This will reduce the production costs.

Although the invention has been described hereinabove with reference to specific embodiments, it is not limited to these embodiments and no doubt further alternatives will occur to the skilled person that lie within the scope of the invention as claimed.

The invention claimed is:

1. A bidirectional bearing comprising:
   an outer bearing shell and a first intermediate bearing shell, which is coupled to a shaft and which cooperates with the outer bearing shell;
   a second intermediate bearing shell, which is arranged opposite to the outer bearing shell with respect to the first intermediate bearing shell, wherein the second intermediate bearing shell is configured to take up a first load having a first direction from the first intermediate bearing shell; and
   wherein the first intermediate bearing shell is configured to receive a second load having a second direction, which is substantially opposite to the first direction, from the second intermediate bearing shell, and wherein the first intermediate bearing shell is configured to transfer the second load to the outer bearing shell.

2. The bidirectional bearing according to claim 1, wherein the bidirectional bearing is a sliding bearing.

3. The bidirectional bearing according to claim 1, wherein the first intermediate bearing shell and the second intermediate bearing shell are arranged to be directly adjacent to each other.

4. The bidirectional bearing according to claim 1, wherein the bidirectional bearing is a spherical bearing providing a bidirectional cardanic or gimballed mount of the shaft.

5. The bidirectional bearing according to claim 4, wherein sliding surfaces between the outer bearing shell and the first intermediate bearing shell, the first intermediate bearing shell and the second intermediate bearing shell, and between the second intermediate bearing shell and the inner bearing shell have a substantially identical centerpoint of radius of curvature.

6. The bidirectional bearing according to claim 1, wherein the outer bearing shell and the first intermediate bearing shell are arranged directly adjacent to each other.

7. The bidirectional bearing according to claim 6, wherein the first intermediate bearing shell comprises a sliding surface, which cooperates with a sliding surface of the outer bearing shell, and the first intermediate bearing shell further comprises an opposite sliding surface, which cooperates with a sliding surface of the second intermediate bearing shell.

8. The bidirectional bearing according to claim 1, further comprising an inner bearing shell, which is configured to couple the second load to the second intermediate bearing shell for further transfer of the second load via the first intermediate bearing shell to the outer bearing shell.

9. The bidirectional bearing according to claim 8, wherein the second intermediate bearing shell and the inner bearing shell are arranged directly adjacent to each other.

10. The bidirectional bearing according to claim 9, wherein the second intermediate bearing shell comprises a sliding surface, which cooperates with a sliding surface of the first intermediate bearing shell, and the second intermediate bearing shell comprises an opposite sliding surface, which cooperates with a sliding surface of the inner bearing shell.

11. A gear arrangement comprising
    a first gear structure;
    a second gear structure; and
    a bidirectional bearing mounted between the first and second gear structures, the bidirectional bearing comprising an outer bearing shell and a first intermediate bearing shell, which is coupled to a shaft and which cooperates with the outer bearing shell, a second intermediate bearing shell, which is arranged opposite to the outer bearing shell with respect to the first intermediate bearing shell, wherein the second intermediate bearing shell is configured to take up a first load having a first direction from the first intermediate bearing shell, and wherein the first intermediate bearing shell is configured to receive a second load having a second direction, which is substantially opposite to the first direction, from the second intermediate bearing shell, and wherein the first intermediate bearing shell is configured to transfer the second load to the outer bearing shell.

12. The gear arrangement according to claim 11, wherein the first and second gear structures comprise planetary gear structures.

13. The gear arrangement according to claim 12, wherein the first planetary gear structure comprises a coupling shaft and wherein the bidirectional bearing supports the coupling shaft of the planetary gear.

14. A drive train comprising:
    a rotor hub;
    a main shaft coupled to the rotor hub; and
    a gear arrangement coupled to the main shaft, wherein the gear arrangement comprises a bidirectional bearing including an outer bearing shell and a first intermediate bearing shell, which is coupled to a shaft and which cooperates with the outer bearing shell, a second intermediate bearing shell, which is arranged opposite to the outer bearing shell with respect to the first intermediate bearing shell, wherein the second intermediate bearing shell is configured to take up a first load having a first direction from the first intermediate bearing shell, and wherein the first intermediate bearing shell is configured to receive a second load having a second direction, which is substantially opposite to the first direction, from the second intermediate bearing shell, and wherein the first intermediate bearing shell is configured to transfer the second load to the outer bearing shell.

15. A wind generator comprising:

a wind generator main shaft; and a gear arrangement coupled to the wind generator main shaft, the gear arrangement comprising a bidirectional bearing including an outer bearing shell and a first intermediate bearing shell, which is coupled to a shaft and which cooperates with the outer bearing shell, a second intermediate bearing shell, which is arranged opposite to the outer bearing shell with respect to the first intermediate bearing shell, wherein the second intermediate bearing shell is configured to take up a first load having a first direction from the first intermediate bearing shell, and wherein the first intermediate bearing shell is configured to receive a second load having a second direction, which is substantially opposite to the first direction, from the second intermediate bearing shell, and wherein the first intermediate bearing shell is configured to transfer the second load to the outer bearing shell.

* * * * *